Jan. 19, 1954  A. BONI  2,666,516
PERMUTATIVELY OPERABLE KEYBOARD AND CHARACTER
SELECTING MECHANISM FOR WRITING MACHINES
Filed March 9, 1950  4 Sheets-Sheet 1

INVENTOR:
ALESSANDRO BONI
BY Wendevill, Lind & Ponack
ATTORNEYS

Jan. 19, 1954　　　　　　　A. BONI　　　　　　2,666,516
PERMUTATIVELY OPERABLE KEYBOARD AND CHARACTER
SELECTING MECHANISM FOR WRITING MACHINES
Filed March 9, 1950　　　　　　　　　　　　　　4 Sheets-Sheet 2
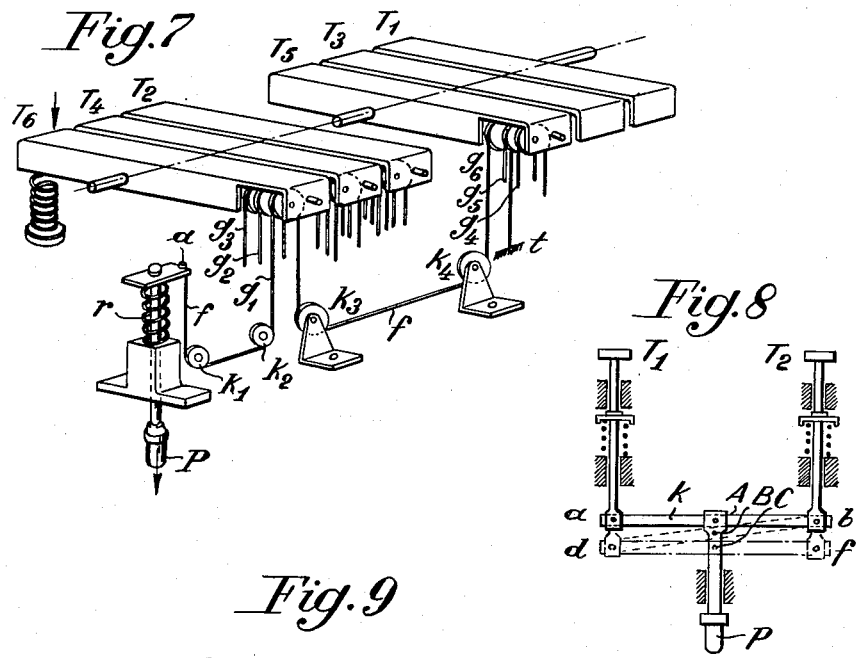
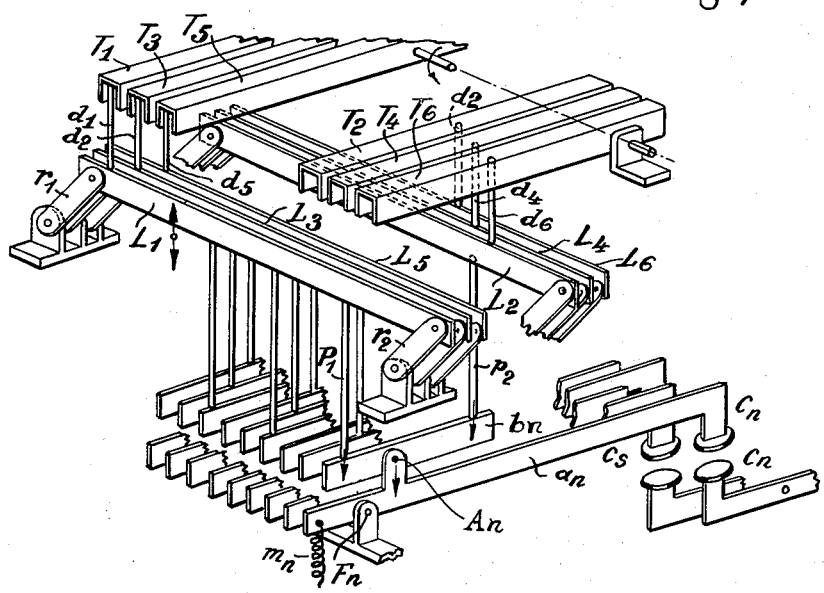
INVENTOR:
ALESSANDRO BONI
By Wenderoth, Lind & Ponack
ATTORNEYS

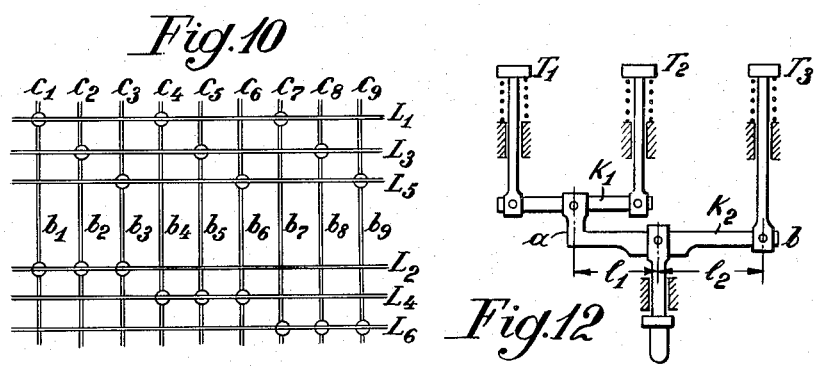
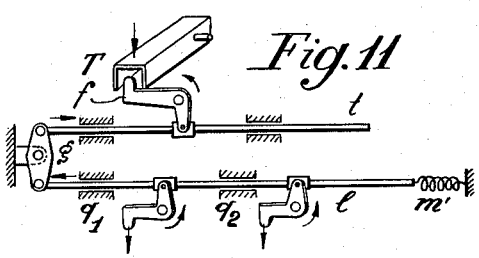
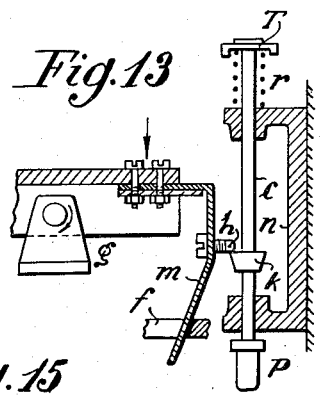
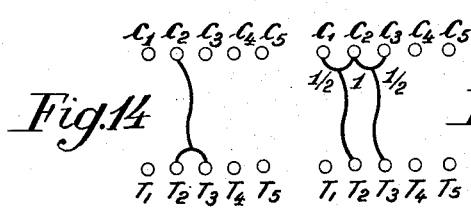
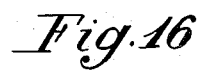
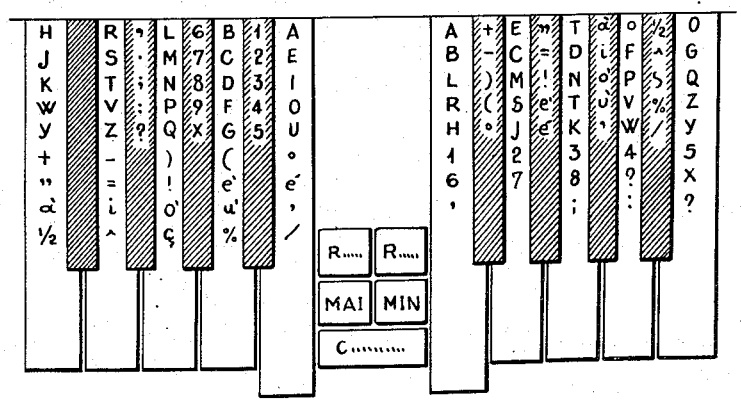

Jan. 19, 1954  A. BONI  2,666,516
PERMUTATIVELY OPERABLE KEYBOARD AND CHARACTER
SELECTING MECHANISM FOR WRITING MACHINES
Filed March 9, 1950  4 Sheets-Sheet 4
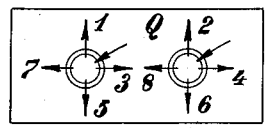
Fig.17
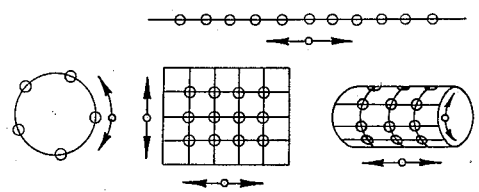
Fig.18
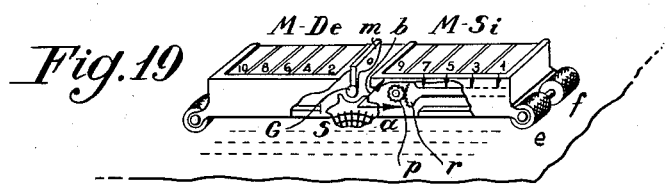
Fig.19
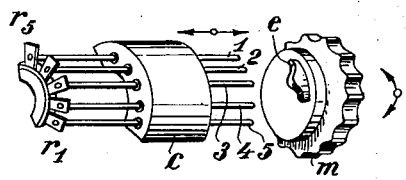
Fig.20
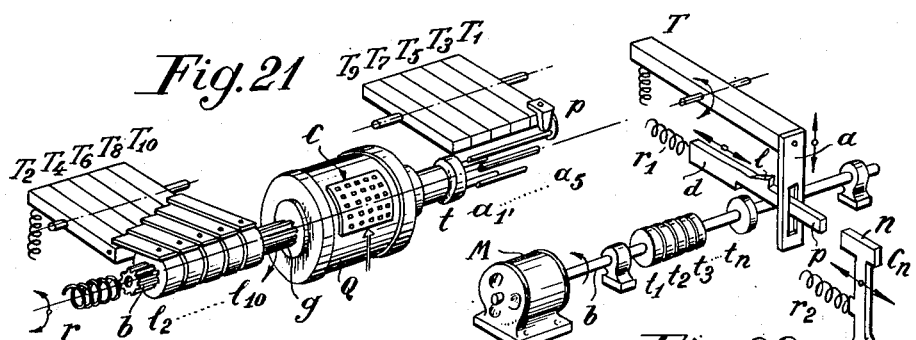
Fig.21
Fig.22
INVENTOR:
ALESSANDRO BONI
By Wenderoth, Lind & Ponack
ATTORNEYS

UNITED STATES PATENT OFFICE 2,666,516

PERMUTATIVELY OPERABLE KEYBOARD AND CHARACTER SELECTING MECHANISM FOR WRITING MACHINES

Alessandro Boni, Rome, Italy

Application March 9, 1950, Serial No. 148,597
Claims priority, application Italy April 1, 1949
4 Claims. (Cl. 197—11)

The present invention has as its object a rapid keyboard for writing machines which aims at avoiding, in general, the movement of the hand as a whole and requires merely the movement of the fingers in order to permit a high speed of writing. This, besides leading to a reduction in effort, avoids the need of looking at the keyboard and, at the same time, requires the operators to use all their fingers with a high working efficiency.

The time required and the difficulty in learning the new keyboard are not such as not to be widely compensated by the advantages deriving from it.

According to the invention, selection is obtained, before each character is impressed, by means of suitable mechanisms through the combined action of two or more fingers: for example, in the case of a system utilizing the action of two fingers, combining the action of each finger of the left hand with that of each finger of the right hand, 5 x 5=25 combinations possible are obtained, using only ten keys; this number may be increased by introducing further keys, possibly to be used only for characters less frequently employed, or by inserting kinematic movements in the machine such that different characters (lower case and upper case) may correspond to the action of the same keys following some particular control.

Such systems will be called hereinafter for brevity "bi-control."

In the systems which can be called "pluri-control," an extension of those referred to above, the typing is preferably made contemporaneously with more than two fingers in order to obtain the selection and impression of only one character or, with special systems, of two or more characters contemporaneously, a thing that is permitted by the multiple combinations possible. These systems will be referred to hereinbelow.

In order that by typing on two or more keys the impression of just one character should be obtained various procedures may be employed, either operating electrically, pneumatically, or just mechanically.

In the electric, or magnetic system, pressing two or more keys leads to the closing of a number of contacts placed in series in a circuit which, when completely closed, leads to excitation of an electromagnet which, in turn operates the impression of the character under consideration.

Similarly, for the pneumatic system, a type of operation of the invention corresponding to the above may be employed; the magnetic circuit is replaced by a tubing which carries the fluid under pressure and which exerts its pressure on a piston which causes the impression of the character only when a number of valves, arranged in series in the tube, are all opened by pressing the corresponding keys.

In the mechanical systems, the motion of the character carrying punch is not completed, and cannot therefore cause impression, except by the contemporaneous action of displacement of a number of keys which act on suitable mechanical transmission systems such as levers, wires wound on pulleys, or differential-type rotation systems; mixed electro-mechanical, magnetic and similar systems may also be used.

It should be noted that operation of the controls according to the invention refers only to the control board and its auxiliary equipment with the object of meeting the requirements of writing with the greatest speed.

As far as the selection of the characters is concerned, as a rule, such selection is effected by subdividing said characters into a first series of groups and then, on the basis of another selection, into another series so that by operating the controls which bring about the selection of the group of the first series, and those which carry a serial group number of the second series, the required character is finally selected through the final combination of two index numbers, selection of the groups being contemporaneously possible by means of the independent relative motions of the various parts of the two hands.

The number of groups must be lower, naturally, than the number of characters, otherwise the improvement would be of no advantage over the systems now in use.

As far as the stenographic machines now employed are concerned, in such machines only one sign corresponds to each key and the simultaneous operation of more than one key by the various fingers results in the writing of a group of signs with which a certain word is conventionally associated, by means of a suitable code. No given character is therefore impressed by operation of more than one control, but a single sign corresponds to each control and the different meaning of the writing is obtained by the combination of signs, as in ordinary typewriters in practice.

It has already been pointed out that the improvement brought about essentially concerns modification of the types of present keyboards and elements immediately connected to them, and does not require essentially modification of other elements of the present typewriters as, for example, the elements forming the kinematic mechanism and the elements for impressing the characters, so much so, that the keyboard according to the present invention may also be given a form of embodiment of an accessory of present machines, although, for better efficiency, it would be better to create suitable models of machines.

The object of the invention is obtained by being based on principles which allow the following characteristics to be reached: to reduce the wideness of motions by distributing the control to the contemporaneous action of more than one finger; to distribute the motion between the fingers so as to reduce the fatigue to a minimum; to avoid motions of the hands as a whole, which necessarily lead to slowness; to make operation spontaneous without requiring a watch on the keyboard and, finally, to permit application of elements such for instance as servomotors, capable of giving immediate execution of operation at the lightest touch on the corresponding key.

Some forms of embodiment of the invention are illustrated in the attached sheets of drawings, in which:

Fig. 7 illustrates the general arrangement of parts in a bi-command wire system;

Fig. 8 illustrates the plan for a bi-command operation with a mechanical lever-type system;

Figs. 9 and 10 give a view and a diagrammatic plan of the general arrangement of parts in a bi-command system effected with a mechanical balance-beam and lever system;

Fig. 11 illustrates diagrammatically a particular type of operation with tie-rod and counter-tie-rod systems;

Fig. 12 illustrates a tri-command device in one of its forms of embodiment, with lever mechanisms;

Fig. 13 illustrates a particular of a device with catch operation, complete with character bearing punches;

Figs. 14 and 15 illustrate, diagrammatically, the utilization of the motions or partial controls in the electrical, pneumatic and mechanical systems;

Fig. 16 illustrates one type of arrangement of a control keyboard similar to that of a piano;

Fig. 17 illustrates, diagrammatically, a control handle bi-command system;

Fig. 18 illustrates diagrammatically the possible grouping of the characters in linear, circle, plain grid or cylindrical surface series in view of their selection;

Fig. 19 illustrates a reduced size, bi-command typewriter with characters on a spherical surface and divider motion on rollers;

Fig. 20 illustrates the device for the conversion of a rotation movement of various amplitudes into the rectilinear movement of various rods, used as push-rods;

Fig. 21 illustrates a device for the conversion of the normal motions of keys into rotation movement of a drum and advancement of a number of rods;

Fig. 22 illustrates a device in which the keys effect impression of characters through the use of a servomotor.

Figure 1:
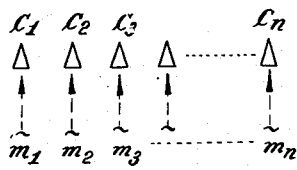
Fig. 1 illustrates, diagrammatically, the arrangement of present keyboard systems.

With reference to the drawings:

The type of machine now employed enters within the scope of the type diagrammatically indicated in Fig. 1, in which the impression of each character $C_1$, $C_2$, $C_3$ . . . $C_n$, corresponds to a single displacement of a key $m_1$, $m_2$, $m_3$ . . . $m_n$; the movement of the key is downwards and is a consequence of the pressure and bending of the finger, accompanied by movements of the wrist and the hand.

Figure 2:
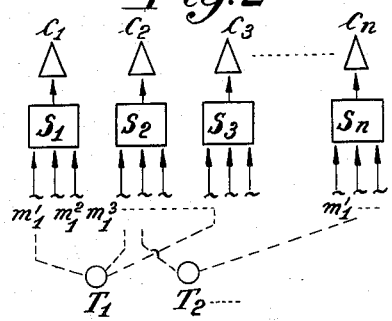
Fig. 2 represents the general plan of the system of co-operation of controls according to the invention.

The scheme, to which the keyboard envisaged in the present invention belongs is, in general, illustrated by Fig. 2 where each single character $C_1$, $C_2$, $C_3$ . . . $C_n$, corresponds to the impression of that single character as a result of the summation of the controls effected at $S_1$, $S_2$ . . . $S_n$, while the controls relating to $C_1$ are distinguished with an index 1 below it and, for instance, a number of indexes above it, that is for $C_1$, with $m_1^1$, $m_1^2$, $m_1^3$ . . . and also for example $C_n$, with $m_n^1$, $m_n^2$ . . .

The generic partial control could be indicated with $m_k^r$ to signify the $r$th command relative to the $k$th character.

If one stopped at this point one would only have a multiplication of the number of controls required to operate the characters, and therefore a complication: the advantage however becomes immediate when one places the $m_k^r$ in groups under the control of a limited number of group controls $T_1$, $T_2$ . . . (Fig. 2).

Figure 3:
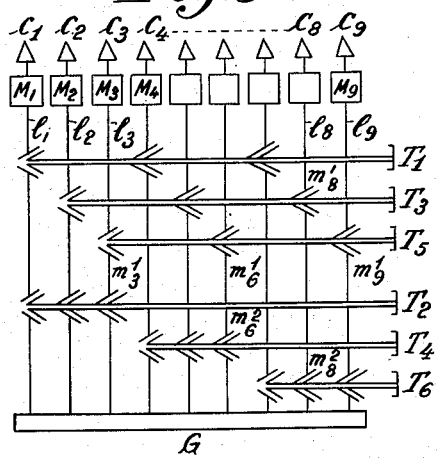
Fig. 3 illustrates a typical plan of a bi-command system, with reference to nine combinations, relative to two classes, each class having three group keys.

This example is more clearly illustrated in Fig. 3 relative to $n=9$ characters. In this case the impression of each character takes place through the generators of movement $M_1$, $M_2$ . . . , each of which is not excited except through the simultaneous operation of two controls, and therefore this system enters into the field of bi-command types; the partial commands for $C_6$, for example, are those indicated by $m_6^1$, $m_6^2$, which are part of the push buttons of groups $T_5$ and $T_4$. It will be observed from the figure that the operation of push button $T_5$ causes preselection of the three characters $C_3$, $C_6$, $C_9$, starting a partial movement towards impression, but this movement is not completed until one of the even numbered buttons is pushed; therefore while operation of $T_4$ would give impression of $C_6$, operation of $T_2$ or $T_6$ would give the impression respectively of $C_3$ or $C_9$. It is apparent from the figure that it does not matter whether the odd numbered buttons $T_1$, $T_3$, $T_5$ or the even numbered buttons $T_2$, $T_4$, $T_6$ are operated first.

With reference to the same Fig. 3 it will be seen that a possible generator of the required power to operate $M_1$, $M_2$, . . . has been indicated at G, in case $T_1$, $T_2$ . . . should only have the function of controlling some valves generically and should not have a direct motive function.

Figure 4:
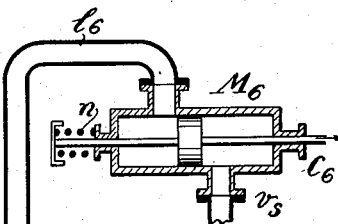
Fig. 4 represents a general bi-command plan for twenty five combinations, relative to two groups of five keys.

Another plan of bi-command example is illustrated in Fig. 4, for 25 characters in relation to the twenty-five possible combinations of the five even-numbered group controls with the five odd-numbered controls. For example, it is to be understood that operation of push-buttons T₈ and T₅ lead to the impression of the character indicated by $t_8^5$.

In substance, in the bi-command and pluri-command systems, impression of a character is obtained by the combined action of two or more group buttons.

The devices with which the desired object can be attained, may be realized in various forms.

Figure 5:
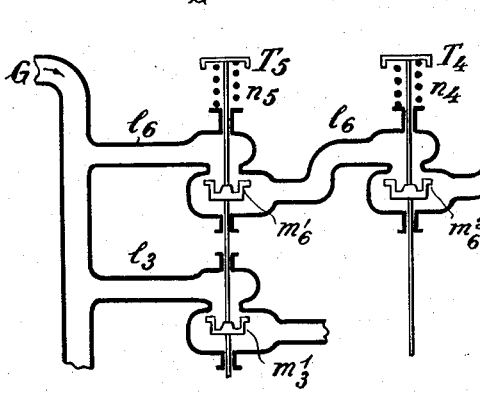
Fig. 5 illustrates one form of bi-command embodiment, with a pneumatic system and valves in series, arranged in groups.

For example, Fig. 5 indicates the embodiment by means of a pneumatic device of one part of the system illustrated in Fig. 3; the letters keep their same general significance. Thus the control lines $l_1, l_2, \ldots l_9$ in Fig. 3 becomes the tubes in Fig. 5 such as, for example, $l_3, l_6,$ of a fluid under pressure arriving from G (as, for example, a container of compressed air supplied by a compressor). The $m_6^1$ and $m_6^2$ in Fig. 5 indicate valves placed in series along tubing $l_6$, and their opening is controlled by buttons $T_4, T_5$ provided with return springs $n_4, n_5$; opening of the valves causes movement of the piston in cylinder $M_6$, and impression of the character $C_6$ is thus effected; at the end of its useful stroke the piston uncovers a vent $v_5$ for the compressed air, and the piston returns to its position of rest under the action of spring $n$. The piston's inertia assists in correct impression. Naturally the push rods cause contemporary opening of other valves, thus $T_5$ operates $m_3^1$ and $m_9^1$ in addition to the said $m_6^1$. This plan is purely indicative and can have many variations as can be deduced from pneumatic command practice.

The same plan illustrated in Fig. 3 can also be operated electrically; the lines $l_1, l_2 \ldots l_9$ then become conductors and the operating controls $m_k^r$ become switches; the $M_1, M_2$ assume the form of electromagnets whose moving armatures are tied to the impression of the character; G becomes a source of electrical power and it is easy, based on Fig. 3, to trace the electrical diagram just as was done in Fig. 5 for the pneumatic device.

It is understood that the number of valves operated by each group button can be any desired, just as the valves arranged in series can be more than two if it should be desired to create a form of pluri-command instead of a bi-command system.

The said electrical and pneumatic systems are not the only ones possible in order to realize the invention, but there can also be embodiments which utilize solely mechanical-type devices.

Figure 6:
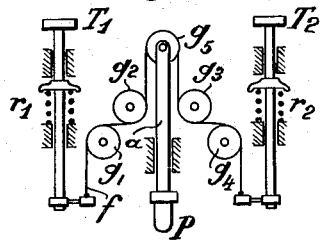
Fig. 6 illustrates one plan for bi-command embodiment, with a wire-type mechanical system.

Fig. 6 illustrates a system for adding together, by wire means, the strokes of two keys $T_1$ and $T_2$. In this figure, $r_1$ and $r_2$ simply indicate return springs in their position of rest; $g_1, g_2, g_3, g_4$ are fixed pulleys while pulley $g_5$ is movable, being carried by rod $a$ of punch P.

When key $T_1$ is pressed, only half of the stroke of punch P required for impression of the character is obtained by means of wire $f$; if $T_2$ is pressed simultaneously however, the two movements add together resulting in a complete stroke of P. It is understood of course that P can either effect impression of the character directly or through intermediate kinematic organs. It can, for example, press on the keys of the keyboard of an ordinary typewriter and in such a case the device would be in the form of an accessory with the object of merely modifying the operation of existing machines.

Such an embodiment might be held to be advantageous in order to utilize equipment which is already in use although it would be better, naturally, in general, to utilize special typewriters embodying the invention.

Fig. 7 gives some details as to the arrangement of the various parts on the basis of the principle indicated in Fig. 6. An example is given in said Fig. 7 of the use of six keys, the total number of combinations being $3 \times 3 = 9$ as was already pointed out in regard to Fig. 3. Each key is equipped with three pulleys—key $T_5$, for example, having those indicated as $g_4, g_5, g_6$, and key $T_6$ those indicated as $g_1, g_2, g_3$. The letters $k_1, k_2 \ldots$ indicate fixed-axis pulleys. A punch P corresponds to each character. In the figure, only one has been indicated instead of the nine possible, for clearness; to each punch P, held in its position of rest by return spring $r$, a wire $f$ is anchored by means of appendage $a$. Said wire runs on four fixed pulleys and two movable pulleys each of the latter being fastened to a group button T; each wire $f$ is anchored at its other end to a fixed point $t$. If, for example, the button or key $T_5$ is pressed, the pulleys $g_1, g_2, g_2$ are lifted and three of the corresponding punches such as P make a partial movement towards impression; only by pressing an odd numbered key, however, such as $T_5$ for example, which causes three other pulleys $g_4, g_5, g_6$ to be lifted, do we have the combination of movements of $g_6$ and $g_1$ and, by means of wire $f$, punch P makes a complete stroke causing impression. (It should be noted that the length of movement of each pulley is doubled in relation to the movement of the wire and therefore relation to P.) The usual observations regarding possible variations, the employment of a different number of pulleys and keys, the duties assigned to P and so on, are repeated again here.

Fig. 8 illustrates another device of the bi-command type in which the combined movements of levers are utilized. The lever K which joins the fulcrums $a$ and $b$ connected to keys $T_1$ and $T_2$, assumes the position indicated by the dotted line between points $d$ and $b$ when only one key, for instance $T_1$ is pressed; the punch P in this case moving only about half of its full stroke; when key $T_2$ is also pressed, the lever K takes up the position which is also indicated by a dotted line, between points $d$ and $f$, so that punch P completes its stroke required for impression.

It is understood of course that $T_1, T_2$ and other group keys move as many levers such as K as there are characters in the group, and there is a total number of levers like K and punches like P as there are characters.

Fig. 9 illustrates an embodiment of a lever type bi-command system. Referring to the keys numbered 1 to 6, each key has its relative pressure rod $d$, which operates on a corresponding cross lever L, which goes downward or upward always parallel to itself since it is mounted on an articulated parallelogram whose cranks are indicated in the figure as $r_1$ and $r_2$. A couple of levers such as L, as for instance $L_1$ and $L_2$, act through the pressure rods $p_1$ and $p_2$ on the extremities of the rocking lever $b_n$ and thus the strokes of levers $L_1$ and $L_2$ are added together on the pivot $A_n$ and transmitted to the lever $a_n$, which is pivoted at $F_n$, said lever effecting impression of the character $C_n$. There are, of course, as many levers such as $a_n$ and $b_n$ as there are characters; whereas there are as many levers such as L as there are commanding keys T.

This is illustrated more clearly in the schematic plan in Fig. 10, in which the job of lever L of distributing transversely the movements received from keys T at the desired points, as for example at the points indicated by the little circles shown in the figure, is clearly indicated.

Instead of the parallelogram levers of Fig. 9 used for transmitting the movement of keys T of a group to the rocking levers $b_n$, tie rods $t$ and counter tie rods $l$ as shown in Fig. 11 can be used. The pressing of a group key T is then transformed through the bell crank lever $f$ into a longitudinal movement of the tie rod $t$. The idea of connecting bell crank levers $q_1, q_2 \ldots$ acting, as in Figure 9 on the ends of a rocking lever $b_n$, to the tie rod $t$, would result in levers $q$, if inserted some to the right and some to the left of $f$, giving rise at $t$ to pressure as well as traction stresses. This drawback can be eliminated by the use of counter tie rod $l$, which is always subjected to the tension of spring $m$ and to which longitudinal movement is transmitted from tie rod $t$ with the introduction of end lever $g$.

Both the procedures of addition by the wire system and by the lever system can be extended from bi-command to pluri-command; for example, Fig. 12 illustrates a lever system for tri-command; keys $T_1$ and $T_2$ operate the lever $K_1$ and therefore the end $a$ of a second lever $K_2$, which, at its other end $b$ receives the movement of another key $T_3$; thus the movement of the three keys add up their effect towards the total stroke, effects which can, for example, be graduated by proportioning the arms $l_1$ and $l_2$ of the second lever $K_2$.

Fig. 13 indicates a possible constructional detail for the catch operation of a punch P so as to prevent uncertainties or prolonged lowering of key T from creating interferences or the multiple impression of characters, especially in the electrical or pneumatic systems used without intermediate kinematic organs.

This particular device also has an advantage towards the total impression speed of the system.

In said Fig. 13, the stem $c$ of punch P which can move in its guide $n$, by overcoming the action of spring $r$, is forced down when key T is lowered through the interaction of catches $h$ and K which have inclined planes, the second catch K being fixed to stem $c$ while catch $h$ is fixed to a flat spring $m$ which, when T is lowered, penetrates into window $f$ and is forced back, thus causing disengagement of the two catches $h$ and K; when impression has been effected, the spring $r$ returns punch P to its starting position and this is possible due to the fact that in the return movement the catches present their inclined surfaces to one another.

The complete stroke and catch devices may have variations dictated by present technical knowledge.

It should also be noted, with reference to the general plans illustrated in Figs. 14 and 15 that while the electrical and pneumatic devices open the way, through the combination of controls of two or more group keys, to the operation of the character required each time, leaving all the others unoperated as in the plan of Fig. 14, the operation of a group key shown diagrammatically in Fig. 15 impresses a partial movement, as, for example, half a stroke, to the members connected with several characters, while the total stroke 1 is only attained for a determined character by pressing another group key. The difference in behaviour does not affect the result and is not, therefore, essential; in the mechanical system too, things can be arranged, introducing dead spaces for example, so that the partial stroke of a key does not by itself generate any movement towards impression, but such movement begins only when the stroke is completed by the second partial stroke related to another key.

Mixed forms of relation are possible between the groups of characters on the one hand and the groups and combinations of keys on the other.

The keys related to the group push rods may be given any form desired as, for example, that of the present keyboards of writing machines; but a form similar to that of the keys of a piano is particularly useful.

A keyboard of this type is illustrated in Fig. 16, in which there are five white keys (larger) and four black keys (smaller) for the left hand and the same for the right hand; it is better that the keys related to the thumbs be longer so that said thumbs may rest more easily on their keys and not require bending the hand; this is possible because the hand must not move over the whole keyboard but the same finger always corresponds to one key.

A group push rod corresponds to each key. With the white keys alone, one obtains $5 \times 5 = 25$ combinations which include all letters of the alphabet. By combining the four black keys related to the right hand with the white keys of the left hand, one obtains an additional twenty combinations and a similar number is obtained by combining the black keys of the left hand with the white keys of the right hand; such combinations may be utilized for numbers, punctuation marks and commercial signs.

The combinations indicated sum up to a total of 65; if keys such as those indicated in Fig. 16 by MAI and MIN are also included for the change between capitals and small letters, the number of combinations can be doubled—that is, increased to 130, a number which is quite adequate for all necessities.

As an example of the use of the keyboard, by pressing down the third finger of the left hand, the characters R, S, T, V, Z, --, =, $i$, ∧ are prepared for printing; this printing however is not completed until one of the keys connected with the right hand has been pressed either afterwards or contemporaneously; for example by pressing the first finger of the right hand one obtains S, while pressing the second finger gives T and so on.

As can be seen from the example, it is not always necessary to press down with two fingers on different keys to change characters; it is enough to keep one finger pressed down and only press with one finger of the other hand, either right or left.

This naturally reduces the fatigue in writing thus increasing the possibility of speed.

In addition, while two keys are being pressed down completely, the pressing of another couple of keys with other fingers can be started.

With exercise it is no longer necessary to look at the keyboard in choosing the keys and an instinctive movement of the fingers is obtained such as is necessary in choosing each character. A very high speed of writing is thus obtained, due to the reduction in amplitude of the movements of the hand.

The keyboard illustrated in Fig. 16 is purely indicative both as regards the number of group keys and as regards the arrangement of the letters which can be established on the basis of the frequency of the letters in the language used while keeping in mind, as far as the combinations are concerned, the strength and agility of the various fingers.

The length of the downward stroke of each key must also be determined on the basis of comparative experiments with regard to the final efficiency.

In present typewriters this stroke is roughly 15–18 millimeters, whereas in piano keyboards which are of a similar type, the stroke is in general 10–12 millimeters; for this particular type of keyboard even strokes of an extremely reduced length could be employed, such, for instance, as 2–3 millimeters.

It should also be kept in mind, however, that for equal mechanical work the force employed is inversely proportional to the stroke and therefore, in the case of short strokes, since great forces are required, it would be necessary to employ electric servomotors or other systems to operate the machine.

However, if it is considered that mechanical power and pulses must be taken into consideration in addition to the work involved, it might even prove useful to have relatively short strokes for machines of a particularly light type, without servomotors.

The keyboard described above meets normal requirements of practice; some different forms of bi- and pluri-command adapted for special uses will be however indicated hereafter as a complement.

In particular, if it is planned to use not merely a single finger of each hand but also two or more fingers of the same hand, various types of machines can be obtained.

For example, by using a keyboard with ten keys and presuming that the system be realized so as to press two keys on the left hand side with the left hand and the same number with the right hand, $10 \times 9 \div 2 = 45$ combinations can be obtained; by using three fingers, there are $10 \times 9 \times 8 \div 6 = 120$ possible combinations; and these numbers can be doubled with the capital-small letters change systems.

Such systems can find particular employment in machines of the linotype variety or that employing many special characters, as, for example, mathematics or oriental languages.

In this case too, the keyboard of Fig. 16 could be sufficient, perhaps if equipped with additional systems for the change of character series.

Further possibilities are offered through the use of devices which take into account the order of partial strokes, in other words operated not according to combinations but according to the arrangement of the controls.

Keyboards could also be created for use by one hand only (as, for example, in the particular field of mutilated persons); with only five keys and by pressing with two fingers, 10 combinations can be obtained and if one-finger strokes are also employed, an additional 5 can be obtained, whereas if three-finger strokes are admitted, an additional 10 can be obtained, giving a total of 25 combinations; a fourth finger can be utilized to select the impression of the character corresponding to the desired combination with one, two or three fingers.

By doubling the system described, that is, by employing two keyboards set side by side, of the pluri-command type each capable of giving the impression of one character when pressing with the fingers of the appropriate hand, either left or right, one can have the possibility of the obtaining simultaneous impression of two characters; this system is adapted for very high speeds of writing but requires highly specialized personnel that has had much practice. In addition, the system requires modification of the carriage operating mechanism and a duplication of the characters and, perhaps, of the related transmission systems in case two of the same or different characters should have to be impressed side by side.

Up to now, forms of keyboards of the bi- and pluri-command types operable by fingers have been described because this is the usual manner of obtaining the greatest speed, but it is not to be excluded that for special cases the system could be arranged in reference to the movement of the hands as a whole or even to the movement of one hand as a whole and the movement of the fingers of the other hand.

Thus, for example, Fig. 17 illustrates a bi-command system related to the movement of the two hands as a whole; both the right and left hands can each grip a handle, each of which is capable of five movements as follows: forwards, backwards, to the left, to the right and downwards, so that with the simultaneous operation by the two hands one obtains 25 combinations corresponding to as many characters. The controls can also be arranged so as to obtain 36 combinations. The devices employed in such handle-controls may be similar to those described in reference to the use of the movement of the fingers alone.

The mixed system in which the motion of one hand as a whole is employed in combination with the movement of the fingers of the other hand is susceptible of various forms of realization.

In general, the movement of one hand as a whole may be usefully employed for the selection of a group of characters, whereas the movement of the fingers can make the final selection of the character required in the previously selected group. While the devices previously described may be again employed where operation of the keyboard by the fingers is concerned, the operations by the hand as a whole could be obtained with various devices as, for example, in cases depending on whether the movement as a whole is to cause selection of a group of characters arranged as shown in the various examples in Fig. 18, in a linear series, or whether the controls correspond to the vertices of a flat grid with several lines, or the points of division of a circle or a spiral or circles which are sections of cylindrical surfaces where the combination of rotation and axial movement is desired; other surfaces on which the characters are arranged may also be imagined.

Fig. 19 illustrates, as an example, the use of a spherical surface for application to a machine of reduced size.

The characters may be supposed to be arranged on a spherical surface S, at the points where five meridians meet five parallels (in the case where it is desired to have 25 combinations). The surface S can rotate around two orthogonal axes passing through the center of the sphere and indicated schematically in the figure by $a$ and $b$, with devices of well-known types to cause the selected character to be brought down to the lowermost point of the sphere, in other words closest to the sheet on which impression is to be made; said impression takes place when a small hammer or plunger hits a spherical cavity at the center $c$ of the character carrying device.

The amplitude of the two rotations of the sphere around the said axes is controlled by a toothed gear $p$ which engages a sector $r$, rotation of the latter around a fulcrum being regulated by lever $l$, submitted to the thrust of the keys, and since the arms of application of said thrust are of different length, the amplitude of rotation of the sphere is different for the same stroke of one or another key. This system can also be a bi-command one with ten keys—five to the left and five to the right, as indicated in Fig. 19 by M—Si and M—De—and said keys can be much shorter than those of a piano, thus particularly reducing the dimensions of the machine as a whole.

Knurled rollers take care of the correct movement along the lines on the paper; movement takes place one interval at a time and, to pass from one line to another, two rollers could be employed, for example, at each side; thus, for example, of the two rollers indicated by $e$ and $f$, the one marked $e$ could be non-movable along its axis, while the one marked $f$ could be capable of movement against a spring so that, by first resting $f$ and then $e$ on the surface, the device could be made to move in such a manner as to write on parallel lines.

Half the stroke of the keys could be used to regulate the amplitude of rotation of the sphere, in other words the selection, while the other half of the stroke could be used by each key to load the hammers and to effect percussion.

The essential characteristic of the device according to the invention is naturally the employment of the pluri-command principle and the various embodiments, and in particular the arrangement and form of the keys, etc., may be realized in any different manner as suggested by present technical knowledge.

It should be noted finally that the passage from a system which presupposes the movement as a whole of the two hands to another system in which use is made of the movement of the fingers, apart from the advantage offered relatively to the latter in relation to the speed of writing, consists merely in the interposition of an organ of conversion between the control mechanisms as, for example, is illustrated in Figs. 20 and 21.

In Fig. 20 the movement of the hand as a whole, impressing a rotation having five different angular values on the handle $m$, is transformed through cam $e$ suitably fixed to the handle and suitably shaped, into a translation movement of the five push rods indicated by the numbers 1, 2, 3, 4, 5, which can move in the block $c$, said rods being returned to their position of rest by springs $r$; the movement of said rods may be utilized for the impression of the characters as in the case of the movement of the keys in a typewriter. In substance, in this case it is sufficient to insert a system for transforming a rotary step by step movement into a rectilinear movement of some rods.

Fig. 21 illustrates instead how a rocking movement impressed on one of the even numbered keys $T_2$, $T_4$, $T_6$, $T_8$, and $T_{10}$ related to the fingers of the right hand, can be transformed through a system of levers $l_2$, $l_4$, $l_6$, $l_8$, and $l_{10}$ into a movement of rotation of a cylindrical body $Q$ which can take up five possible angular positions, one in the middle and two on each side, to each of which positions a line of five characters, for example, corresponds. The final selection of one of these characters for impression is controlled contemporaneously or successively by the odd-numbered key system $T_1$, $T_3$, $T_5$, $T_7$, $T_9$, related to the left hand; each of these keys, for instance, is equipped with a shaped extension $p$ which, when the key is pressed down, causes advancement of the corresponding rod among the five pressure rods $a_1, \ldots a_5$, each having an axial movement of a different amount. At $t$ the rod forces drum $Q$ to advance along its axis until it reaches the point marked by arrow $f$ where impression of the selected character can be effected.

Said movement of translation of $Q$, besides being opposed by spring $r$ by which it is returned to its position of rest, does not interfere with the preceding rotation movement of $Q$, since levers $l$ can move freely along shaft $b$ of the drum although they always transmit the movement of rotation by means of a series of rectilinear grooves cut into shaft $b$.

It is to be understood that movement, instead of being impressed on the drum, may be impressed by one of the rods $a$ on the sole line of characters desired; in this case, instead of using five push rods, it may be more convenient to use merely one with the duty of pushing the line of characters when said line has been brought opposite the rod $a$ by the rotation of the drum.

This system, like the one previously illustrated and other similar systems, enters within the sphere of bi-command keyboards and does not require the present type of transmission mechanism of typewriters.

Naturally, when designing and constructing said devices, these transmissions must be arranged so as to be capable of supplying an immediate reply to the controls assigned to them.

Finally some indications are given regarding generators, schematically marked G in the plan of Fig. 3. It has already been stated that said generators may be composed of a source of electric power, or a tank of fluid under pressure.

The employment of servomotors in writing machines goes, naturally, beyond the scope of this invention and it is therefore merely as an example that a method of employment of an electric motor is here indicated. In Fig. 22, M indicates a motor in constant operation which turns the shaft $b$, which is also in constant rotation and on which the drums $t$ are fastened, said drums having different forms if necessary, such for example as cams, toothed wheels, etc. The pushbutton $p$ acts against hammer $n$ which is related to character $c_n$ when the anchoring stop $a$ carried by key $T$ is lifted by pressure on the key. Tooth $e$ is thus freed and the pushbutton $p$ effects its stroke under the action of spring $r_1$. As soon as key $T$ is left free, the anchoring stop $a$ moves downward and presses pushbutton $p$ against drum $t_n$ which, turning, acts by friction on $p$ and returns it to its previous position in which it is held by tooth $e$; the action of drum $t_n$ is effected on the protruding part $d$ of the pushbutton and the friction effect terminates only when the whole return movement relative to part $d$ has taken place. Such servomotors can also be employed for the return of the carriage which is thus, with the aim of always increasing the speed, subtracted from the influence of the hand and placed under the control of a key.

I claim:

1. A rapid keyboard particularly for writing machines, comprising in combination a first series of keys adapted to be operated by the right hand, a second series of keys, symmetric to the first one, adapted to be operated by the left hand, a plurality of characters to be printed and indirectly controlled by said keys, a plurality of rocking levers, one for each of said characters, each said rocking lever being pivoted at its middle point and connected at one end to one of the right hand keys and at the other end to one of the left hand keys, said rocking lever being arranged to cause the complete displacement of its pivoting point necessary to have the character printed only by the combined action exerted upon its ends by the right hand key and the left hand key to which the said ends are connected, and a plurality of rods causing the printing of the characters, each of said rods being connected at one end to one of said rocking levers at the pivoting point thereof and being movable to cause the printing of the related character only when the pivoting point of the rocking lever makes its complete displacement owing to the combined action exerted upon its ends by the right hand key and the left hand key to which said ends are respectively connected.

2. A rapid keyboard particularly for writing machines, comprising in combination a first series of keys operable by the right hand, a second series of keys symmetric to the first one operable by the left hand, a plurality of characters to be printed and indirectly controlled by said keys, a plurality of rocking levers, one for each of said characters, each said rocking lever being pivoted at a point between the two ends thereof, a plurality of cross levers each articulatedly supported at the two ends by two cranks of equal length to lift and lower parallel to itself, and connected at one side to one of the right hand or left hand keys and at the other side to one of the ends of a group of rocking levers of said plurality of rocking levers, and an amplifying rocking lever connected to each of said first mentioned rocking levers at the pivoting point of the latter, said amplifying rocking lever being adapted to directly cause the printing of the character when the pivoting point of the rocking lever first mentioned makes its complete displacement owing to the combined action exerted upon its ends by the right hand key and the left hand key to which the said ends are respectively connected.

3. A rapid keyboard, particularly for writing machines, comprising in combination a first series of keys operable by the right hand, a second series of keys symmetric with the first one, to be operable by the left hand, a plurality of characters to be printed and indirectly controlled by said keys, a plurality of rocking levers, one for each of said characters, each said rocking lever being pivoted at a point between the two ends thereof, a plurality of horizontal tie rods connected to said keys and moved therefrom, a bell crank lever connecting a key to a tie rod for transforming vertical movement of the key into horizontal movement of the tie rod, an end lever pivoted at its center and connected at one side to the tie rod, a counter tie rod parallel to said rod connected at the other side of said end lever, and a plurality of bell crank levers connected by one arm to said counter tie rod and by the other arm to one end of said rocking lever, each of said second mentioned bell crank levers connected to said counter tie rod being adapted to transform horizontal movement of the counter tie rod into vertical movement of one end of the rocking lever to which it is connected.

4. A rapid keyboard particularly for writing machines comprising in combination a first series of piano-like keys operable by the right hand, a second series of keys, symmetric to the first one, operable by the left hand, each of said series having five keys located in a plane, and shorter keys disposed intermediate said five keys and projecting upward therefrom, additional keys between the series of the right hand and of the left hand, a plurality of characters to be printed and indirectly controlled by said keys, a plurality of rocking levers, one for each of said characters, each said rocking lever being pivoted at a point between the two ends thereof and being connected at one end to one of said right hand keys and at the other end to one of said left hand keys, said rocking lever being arranged to cause complete displacement of its pivoting point necessary to have the character printed only by the combined action exerted upon its two ends by the right hand key and the left hand key to which the said ends are connected, a plurality of kinematic devices to directly cause the printing of the characters, each of said kinematic devices being connected at one end to one of said rocking levers at the pivoting point thereof and being movable to cause printing of the relative character only when said pivoting point makes its complete displacement, each of said right hand keys and each of said left hand keys being connected with a group of characters in such a way that each character may be controlled through a rocking lever owing to the combined action upon the ends of said lever exerted both by a right hand key and a left hand key.

ALESSANDRO BONI.

References Cited in the file of this patent

UNITED STATES PATENTS

| Number | Name | Date |
|---|---|---|
| 880,391 | McPhee | Feb. 25, 1908 |
| 1,578,300 | Vondra | Mar. 30, 1926 |
| 1,906,167 | Linhares | Apr. 25, 1933 |
| 2,031,017 | Tevis | Feb. 18, 1936 |